United States Patent
Kollar et al.

(10) Patent No.: US 12,324,049 B2
(45) Date of Patent: Jun. 3, 2025

(54) IDENTIFICATION OF COMMUNICATION SESSIONS MISTAKENLY DETECTED AS NORMALLY TERMINATED FROM NETWORK PERSPECTIVE

(71) Applicant: Nokia Technologies Oy, Espoo (FI)

(72) Inventors: Martin Kollar, Kosice (SK); Krzysztof Tatarczyk, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 594 days.

(21) Appl. No.: 17/713,496

(22) Filed: Apr. 5, 2022

(65) Prior Publication Data
US 2022/0353713 A1 Nov. 3, 2022

(30) Foreign Application Priority Data
Apr. 28, 2021 (EP) .................................... 21170851

(51) Int. Cl.
*H04W 24/08* (2009.01)
*H04W 24/10* (2009.01)
(Continued)

(52) U.S. Cl.
CPC ........... *H04W 76/30* (2018.02); *H04W 24/08* (2013.01); *H04W 24/10* (2013.01);
(Continued)

(58) Field of Classification Search
CPC ............ H04B 17/0082–409; H04W 8/22–245; H04W 24/02–10; H04W 28/02–26;
(Continued)

(56) References Cited

U.S. PATENT DOCUMENTS

2020/0037390 A1* 1/2020 Axen ................ H04W 28/0268

FOREIGN PATENT DOCUMENTS

| CN | 101656973 A | 2/2010 |
|---|---|---|
| WO | 2020/191779 A1 | 10/2020 |

OTHER PUBLICATIONS

"3rd Generation Partnership Project; Technical Specification Group Services and System Aspects; Telecommunication management; Performance Management (PM); Performance measurements Evolved Universal Terrestrial Radio Access Network (E-UTRAN) (Release 17)", 3GPP TS 32.425, V17.0.0, Dec. 2020, pp. 1-118.

(Continued)

*Primary Examiner* — Timothy J Weidner
(74) *Attorney, Agent, or Firm* — SQUIRE PATTON BOGGS (US) LLP

(57) ABSTRACT

The disclosure relates a technique that allows one to identify communication sessions which are mistakenly detected as normally terminated from the network perspective. The first time period is used to monitor normal session releases initiated by a core network (CN) in respect of communication sessions for UEs. The second time period is used to check whether a Radio Link Failure (RLF) timer is already triggered at the time instant when the normal session release(s) is(are) detected by the RAN node within the first time period. If the RLF timer is already triggered, the number of the communication session(s) to be normally released based on the normal session release(s) from the CN is counted and reported to a network management system when the first time period expires. In response, the network management system properly optimizes RAN or other network parameters such that a call drop rate is improved.

15 Claims, 4 Drawing Sheets

(51) Int. Cl.
| | |
|---|---|
| *H04W 28/02* | (2009.01) |
| *H04W 76/30* | (2018.01) |
| *H04W 76/38* | (2018.01) |
| *H04W 84/02* | (2009.01) |
| *H04W 88/02* | (2009.01) |
| *H04W 88/08* | (2009.01) |
| *H04W 88/12* | (2009.01) |
| *H04W 88/18* | (2009.01) |
| *H04W 92/02* | (2009.01) |
| *H04W 92/10* | (2009.01) |
| *H04W 92/12* | (2009.01) |

(52) U.S. Cl.
CPC ... *H04W 28/0236* (2013.01); *H04W 28/0268* (2013.01); *H04W 76/38* (2018.02); *H04W 84/02* (2013.01); *H04W 88/02* (2013.01); *H04W 88/08* (2013.01); *H04W 88/12* (2013.01); *H04W 88/18* (2013.01); *H04W 92/02* (2013.01); *H04W 92/10* (2013.01); *H04W 92/12* (2013.01)

(58) Field of Classification Search
CPC ........... H04W 36/0005–385; H04W 48/02–20; H04W 56/001–0025; H04W 60/005–06; H04W 76/10–50; H04W 84/02–16; H04W 88/005–188; H04W 92/02–24
See application file for complete search history.

(56) References Cited

OTHER PUBLICATIONS

"3rd Generation Partnership Project; Technical Specification Group Services and System Aspects; Telecommunication management; Performance Management (PM) for mobile networks that include virtualized network functions; Stage 2 (Release 16)", 3GPP TS 28.522, V16.0.0, Jul. 2020, pp. 1-7.

"3rd Generation Partnership Project; Technical Specification Group Services and System Aspects; Telecommunication management; Key Performance Indicators (KPI) for Evolved Universal Terrestrial Radio Access Network (E-UTRAN): Definitions (Release 16)", 3GPP TS 32.450, V16.0.0, Jul. 2020, pp. 1-16.

"3rd Generation Partnership Project; Technical Specification Group Services and System Aspects; Management and orchestration; 5G performance measurements (Release 17)", 3GPP TS 28.552, V17.1.0, Dec. 2020, pp. 1-207.

"3rd Generation Partnership Project; Technical Specification Group Services and System Aspects; Management and orchestration; 5G end to end Key Performance Indicators (KPI) (Release 17)", 3GPP TS 28.554, V17.1.1, Dec. 2020, pp. 1-38.

"Add new measurement related to number of the normally released calls (QCI1 E-RAB) in RLF detected conditions", 3GPP TSG-SA5 Meeting #137e, S5-xxxxx, Nokia, May 10-15, 2021, 3 pages.

"Add new measurement related to number of the normally released calls (QFI1 QoS Flow) in RLF detected conditions", 3GPP TSG-SA5 Meeting #137e, S5-xxxxx, Nokia, May 10-15, 2021, 3 pages.

Extended European Search Report received for corresponding European Patent Application No. 21170851.6, dated Oct. 6, 2021, 9 pages.

"Voice quality Discussion paper", 3GPP TSG-SA5 Meeting #127, S5-196043, Agenda: 6.4.5, Nokia, Oct. 14-18, 2019, 4 pages.

"Rel-17 CR 28.552 Update measurements to consider abnormal releases in RRC connected state", 3GPP TSG-SA5 Meeting #136-e, S5-212071, Ericsson LM, Mar. 1-9, 2021, pp. 1-8.

* cited by examiner

IDENTIFICATION OF COMMUNICATION SESSIONS MISTAKENLY DETECTED AS NORMALLY TERMINATED FROM NETWORK PERSPECTIVE

TECHNICAL FIELD

The present disclosure relates generally to the field of wireless communications, and particularly to a technique that allows one to identify communication sessions (e.g., voice calls) which are mistakenly detected as normally terminated from the network perspective.

BACKGROUND

Voice call drop is one of the main Quality of provided Service (QoS) issues experienced by an end user. Therefore, the existing wireless communication networks (e.g., cellular networks) are designed and optimized to significantly decrease the number of such drops. For example, this QoS issue is under close attention within the framework of the 3rd Generation Partnership Project (3GPP). For this purpose, retainability performance management (PM) counters and Key Performance Indicators (KPIs) have been defined within 3GPP TS 32.425 and 3GPP TS 32.450, respectively, for an Evolved Universal Mobile Telecommunications System (UMTS) Terrestrial Radio Access Network (E-UTRAN). Similarly, for 5G communication systems, the retainability PM counters and KPIs have been defined within 3GPP TS 28.552 and 3GPP TS 28.554, respectively.

One of the KPIs which is of great importance is a call drop rate that is a ratio of a number of dropped sessions to a number of successful session establishments. There are communications operators providing the call drop rate at the level of 5%, 1% or even less. However, there is still a gap to make this KPI equal to 0%, which would basically mean there is no dropped voice call in an observed area and time period. One of the reasons for this could consist in that some group of voice calls is mistakenly identified as normally terminated or released, thereby preventing the communications operators from taking some preventive actions to fix the mistaken identification related to this group.

In fact, voice services are the only ones where end users may terminate, based on a sudden event, a voice call such that it is not perceived as a call drop. A typical situation is when one of calling parties has received an urgent request for some other activity which does not allow him/her to continue the voice call. Then, both the calling parties may agree to terminate the voice call and continue in some other time on another call. A similar situation may happen when one or even both of the calling parties observe some QoS degradation and simply agree to terminate the voice call normally. Despite such a voice call is perceived by the end user as a normal one (i.e. not as a call drop), it however cannot be used to identify a communication problem related to network optimization in terms of its retainability. In other words, this voice call will be mistakenly considered by the network as the one normally terminated rather than released due to the communication problem.

SUMMARY

This summary is provided to introduce a selection of concepts in a simplified form that are further described below in the detailed description. This summary is not intended to identify key features or essential features of the present disclosure, nor is it intended to be used to limit the scope of the present disclosure.

It is an object of the present disclosure to provide a technical solution that allows a Radio Access Network (RAN) node to identify communication sessions to be abnormally released (i.e. due to a communication problem).

The object above is achieved by the features of the independent claims in the appended claims. Further embodiments and examples are apparent from the dependent claims, the detailed description and the accompanying drawings. The embodiments that do not fall under the scope of the claims are to be interpreted as examples useful for understanding the present disclosure.

According to a first aspect, a RAN node is provided. The RAN node comprises a transceiving unit, a storage unit, and a processing unit coupled to the storage unit and the transceiving unit. The storage unit is configured to store processor-executable instructions. Being executed by the processing unit, the processor-executable instructions cause the processing unit to operate as follows. At first, the processing unit monitors whether a Core Network (CN) initiates a normal session release for at least one user equipment (UE) at a time instant within a first time period. The normal session release cause at least one communication session between the at least one UE and the RAN node to be normally released rather than dropped. Then, if the CN initiates the normal session release for the at least one UE at the time instant within the first time period, the processing unit determines whether a Radio Link Failure (RLF) timer has been previously triggered in the RAN node within a second time period. The RLF timer indicates a potential loss of the at least one communication session by the at least one UE. The second time period at least partially overlaps with the first time period such that the time instant is within the second time period. Next, if the RLF timer has been previously triggered in the RAN node within the second time period, the processing unit counts a total number of the at least one communication session to be normally released based on the normal session release for the at least one UE. After that, the processing unit causes the transceiving unit to send a report comprising the total number of the at least one communication session to be normally released to a network management system when the first time period expires. By so doing, the RAN node may identify the communication sessions which are mistakenly detected by the CN as normally released communication sessions, and report the number of such communication sessions to the network management system which, in response, may properly optimize RAN or other network parameters such that a call drop rate is improved in a wireless communication network.

In one example embodiment of the first aspect, the processing unit is configured to perform said monitoring based on at least radio access bearer (RAB) in a 4G wireless communication system. This may make the RAN node according to the first aspect more flexible in use.

In one example embodiment of the first aspect, the at least one communication session to be normally released is at least one voice call. In this example embodiment, the at least one RAB comprises at least one Evolved Universal Terrestrial RAN (E-UTRAN) RAB with Quality of Service (QoS) Class Identifier 1 (QCI1). This may allow the normal session release to be monitored more efficiently in the 4G wireless communication system.

In one example embodiment of the first aspect, the processing unit is further configured, in response to the normal session release, to cause the transceiving unit to receive at least one E-RAB release command from the CN.

By using the E-RAB release command(s), it is possible to monitor the normal session release more efficiently, as well as to simplify the counting of the total number of communication session(s) to be normally released according to the normal session release.

In one example embodiment of the first aspect, the processing unit is configured to perform said monitoring based on at least one QoS flow in a 5G wireless communication system. This may make the RAN node according to the first aspect more flexible in use.

In one example embodiment of the first aspect, the at least one communication session to be normally released is at least one voice call. In this example embodiment, the at least one QoS flow comprises at least one QoS with QoS Flow Indicator 1 (QFI1). This may allow the normal session release to be monitored more efficiently in the 5G wireless communication system.

In one example embodiment of the first aspect, the processing unit is further configured, in response to the normal session release, to cause the transceiving unit to receive at least one Protocol Data Unit (PDU) session release command from the CN. By using the PDU session release command(s), it is possible to monitor the normal session release more efficiently, as well as to simplify the counting of the total number of communication session(s) to be normally released according to the normal session release.

In one example embodiment of the first aspect, the processing unit is further configured to assign an active status to the second time period if the RLF timer has been triggered in the RAN node within the second time period. After that, the processing unit is further configured to store the active status of the second time period to the storage unit. By using the stored active status, the processing unit may easily and quickly determine that the RLF timer has been triggered in the RAN node within the second time period before the time instant indicated in the monitoring operation.

In one example embodiment of the first aspect, the first time period and the second time period are tunable depending on network conditions and user preferences. This may make the RAN node according to the first aspect more flexible in use. In other words, a communications operator may configure the first and second time periods depending, for example, on a type of the wireless communication network involved, and/or a type of the communication service(s) involved.

According to a second aspect, a method for operating a RAN node is provided. The method starts with the step of monitoring, in the RAN node, whether a CN initiates a normal session release for at least one UE at a time instant within a first time period. The normal session release causes at least one communication session between the at least one UE and the RAN node to be normally released rather than dropped. Then, if the CN initiates the normal session release for the at least one UE at the time instant within the first time period, the method proceeds to the step of determining whether a RLF timer has been previously triggered in the RAN node within a second time period. The RLF timer indicates a potential loss of the at least one communication session by the at least one UE. The second time period at least partially overlaps with the first time period such that the time instant is within the second time period. Next, if the RLF timer has been previously triggered in the RAN node within the second time period, the method goes on to the step of counting a total number of the at least one communication session to be normally released based on the normal session release for the at least one UE. After that, the method proceeds to the step of sending a report comprising the total number of the at least one communication session to be normally released to a network management system when the first time period expires. By so doing, the RAN node may identify the communication sessions which are mistakenly detected by the CN as normally released communication sessions, and report the number of such communication sessions to the network management system which, in response, may properly optimize the RAN or other network parameters such that the call drop rate is improved in a wireless communication network.

In one example embodiment of the second aspect, the monitoring step is performed based on at least RAB in a 4G wireless communication system. This may make the method according to the second aspect more flexible in use.

In one example embodiment of the second aspect, the at least one communication session to be normally released is at least one voice call. In this example embodiment, the at least one RAB comprises at least one E-UTRAN RAB with QCI1. This may allow the normal session release to be monitored more efficiently in the 4G wireless communication system.

In one example embodiment of the second aspect, the method further comprises the step of receiving, in response to the normal session release, an E-RAB release command from the CN. By using the E-RAB release command(s), it is possible to monitor the normal session release more efficiently, as well as to simplify the counting of the total number of communication session(s) to be normally released according to the normal session release.

In one example embodiment of the second aspect, the monitoring step is performed based on at least one QoS flow in a 5G wireless communication system. This may make the method according to the second aspect more flexible in use.

In one example embodiment of the second aspect, the at least one communication session to be normally released is at least one voice call. In this example embodiment, the at least one QoS flow comprises at least one QoS with QFI1. This may allow the normal session release to be monitored more efficiently in the 5G wireless communication system.

In one example embodiment of the second aspect, the method further comprises the step of receiving, in response to the normal session release, at least one PDU session release command from the CN. By using the PDU session release command(s), it is possible to monitor the normal session release more efficiently, as well as to simplify the counting of the total number of communication session(s) to be normally released according to the normal session release.

In one example embodiment of the second aspect, the method further the steps of assigning an active status to the second time period if the RLF timer has been previously triggered in the RAN node within the second time period, and storing the active status of the second time period in the RAN node. By using the stored active status, it is possible to easily and quickly determine that the RLF timer has been triggered in the RAN node within the second time period before the time instant indicated in the monitoring step.

In one example embodiment of the second aspect, the first time period and the second time period are tunable depending on network conditions and user preferences. This may make the method according to the second aspect more flexible in use. In other words, a communications operator may configure the first and second time periods depending, for example, on a type of the wireless communication network involved, and/or a type of the communication service(s) involved.

According to a third aspect, a computer program product is provided, which comprises a computer-readable medium having a computer code stored thereon. The computer code, when executed by at least one processor, causes the at least one processor to perform the method according to the second aspect of the present disclosure. This may simplify the implementation of the method according to the second aspect of the present disclosure on any network node, such as the RAN node according to the first aspect.

According to a fourth aspect, a network management system is provided. The network management system comprises a transceiving unit, a storage unit, and a processing unit coupled to the storage unit and the transceiving unit. The storage unit is configured to store processor-executable instructions. Being executed by the processing unit, the processor-executable instructions cause the processing unit to operate as follows. At first, the processing unit causes the transceiving unit to receive the report from the RAN node according to the first aspect. After that, the processing unit uses the total number of the at least one communication session to be normally released to decide whether to modify RAN or other network parameters. By so doing, the network management system may identify the communication sessions which are mistakenly detected by the CN as normally released communication sessions, and properly optimize the RAN or other network parameters such that the call drop rate is improved in the wireless communication network (e.g., a RAN).

According to a fifth aspect, a RAN node is provided. The RAN node comprises a monitoring means configured to monitor whether a CN initiates a normal session release for at least one UE at a time instant within a first time period. The normal session release cause at least one communication session between the at least one UE and the RAN node to be normally released rather than dropped. The RAN node further comprises a determining means configured, if the CN initiates the normal session release for the at least one UE at the time instant within the first time period, to determine whether a RLF timer has been previously triggered in the RAN node within a second time period. The RLF timer indicates a potential loss of the at least one communication session by the at least one UE. The second time period at least partially overlaps with the first time period such that the time instant is within the second time period. The RAN node further comprises a counting means configured, if the RLF timer has been previously triggered in the RAN node within the second time period, to count a total number of the at least one communication session to be normally released based on the normal session release for the at least one UE. The RAN node further comprises a transceiving means configured to send a report comprising the total number of the at least one communication session to be normally released to a network management system when the first time period expires. By so doing, the RAN node may identify the communication sessions which are mistakenly detected by the CN as normally released communication sessions, and report the number of such communication sessions to the network management system which, in response, may properly optimize network parameters such that a call drop rate is improved in a wireless communication network.

According to a sixth aspect, a network management system is provided. The network management system comprises a transceiving means configured to receive the report from the RAN node according to the fifth aspect. The network management system further comprises a processing means configured to use the total number of the at least one communication session to be normally released to decide whether to modify RAN or other network parameters. By so doing, the network management system may identify the communication sessions which are mistakenly detected by the CN as normally released communication sessions, and properly optimize the RAN or other network parameters such that the call drop rate is improved in the wireless communication network (e.g., the RAN).

Other features and advantages of the present disclosure will be apparent upon reading the following detailed description and reviewing the accompanying drawings.

BRIEF DESCRIPTION OF THE DRAWINGS

The present disclosure is explained below with reference to the accompanying drawings in which.

DETAILED DESCRIPTION

Figure 1:
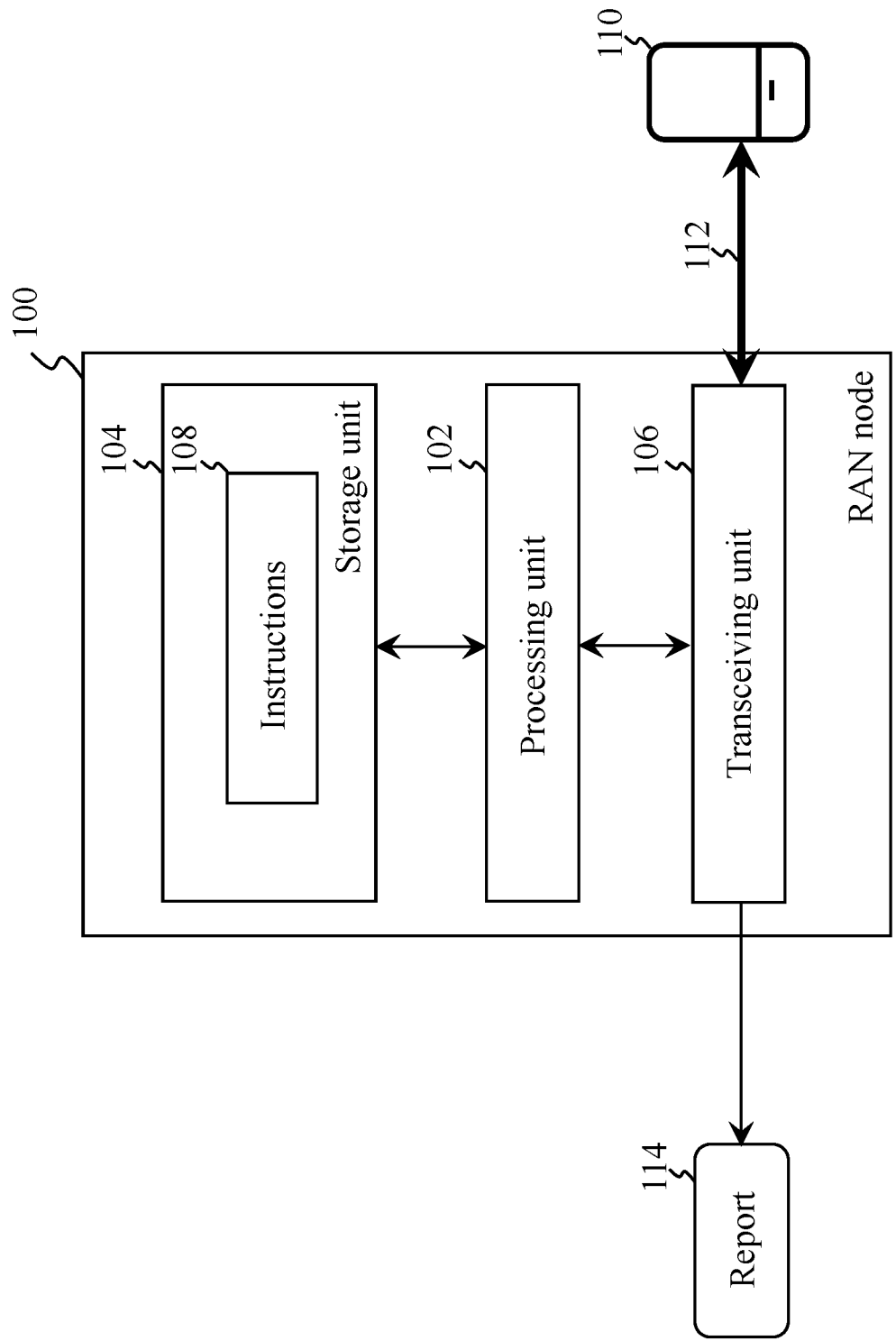
FIG. 1 shows a block diagram of a RAN node in accordance with one example embodiment.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatus, system and method disclosed herein can be implemented in practice by using any numbers of the embodiments provided herein. Furthermore, it should be understood that any embodiment of the present disclosure can be implemented using one or more of the elements presented in the appended claims.

Unless otherwise stated, any embodiment described herein as "example embodiment" should not be construed as preferred or having an advantage over other embodiments.

Although the numerative terminology, such as "first", "second", etc., may be used herein to describe various elements, it should be understood that these elements should not be limited by this numerative terminology. This numerative terminology is used herein only to distinguish one element from another element. Thus, a first time period discussed below could be called a second time period, and vice versa, without departing from the teachings of the present disclosure.

According to the example embodiments disclosed herein, a user equipment or UE for short may refer to a mobile device, a mobile station, a terminal, a subscriber unit, a mobile phone, a cellular phone, a smart phone, a cordless phone, a personal digital assistant (PDA), a wireless communication device, a desktop computer, a laptop computer, a tablet computer, a single-board computer (SBC) (e.g., a Raspberry Pi device), a gaming device, a netbook, a smartbook, an ultrabook, a medical device or medical equipment, a biometric sensor, a wearable device (e.g., a smart watch, smart glasses, a smart wrist band, etc.), an entertainment device (e.g., an audio player, a video player, etc.), a vehicular component or sensor (e.g., a driver-assistance system), a smart meter/sensor, an unmanned vehicle (e.g., an industrial robot, a quadcopter, etc.) and its component (e.g., a self-driving car computer), industrial manufacturing equipment, a global positioning system (GPS) device, an Internet-of-Things (IoT) device, an Industrial IoT (IIoT) device, a machine-type communication (MTC) device, a group of Massive IoT (MIoT) or Massive MTC (mMTC) devices/sensors, or any other suitable device configured to support wireless communications. In some embodiments, the UE may refer to at least two collocated and inter-connected UEs thus defined.

According to the example embodiments disclosed herein, a Radio Access Network node or RAN node for short may refer to a fixed point of communication for the UE in a particular wireless communication network. More specifically, the RAN node may be used to connect the UE to a Data Network (DN) through a Core Network (CN) and may be referred to as a Base Transceiver Station (BTS) in terms of the 2G communication technology, a NodeB in terms of the 3G communication technology, an evolved NodeB (eNodeB) in terms of the 4G communication technology, and a gNB in terms of the 5G New Radio (NR) communication technology. The RAN node may serve different cells, such as a macrocell, a microcell, a picocell, a femtocell, and/or other types of cells. The macrocell may cover a relatively large geographic area (for example, at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (for example, a home). Correspondingly, the RAN node serving the macrocell may be referred to as a macro node, the RAN node serving the microcell may be referred to as a micro node, and so on.

The RAN node may provide a variety of communication services to the UE over a radio link using certain Physical Resource Blocks (PRBs). Such communications services may include voice call services that allow messages to be relayed to end users, customers, or clients through voice recordings. Voice call drop is one of the main QoS issues experienced by an end user when using the voice call services. A radio link failure (RLF) is one of the major players responsible for this issue. The RLF is monitored both in the UE and the RAN node.

On the UE side, the process of continuous RLF monitoring is performed, and once the RLF is detected, T310 timer is triggered in accordance with the existing 3GPP technologies. After the expiry of T310 timer, the UE either goes to a Radio Resource Control (RRC) idle state (which means that a voice call is dropped) or triggers another T311 timer if RRC-reestablishment is possible. If during T311 timer is running, a cell for re-establishment is selected, the re-establishment procedure is initiated. If such a cell is not selected, and after the expiry of T311 timer, the UE goes to the RRC idle state (i.e. the voice call is dropped).

On the RAN node side, the process of similar RLF monitoring is performed, and once the RLF is detected, T-RLF (T310+T311) timer is triggered in accordance with the existing 3GPP technologies. After the expiry of the T-RLF timer, the UE goes to the RRC idle state (i.e. the voice call is dropped). The T-RLF timer is set to a significantly higher value compared to T310 timer on the UE side. This is done to give the UE enough time because, once the RLF is detected, it is the UE which is the major player taking some actions for RLF recovery. However the end user perception on such a condition may be that some of the calling parties agree to terminate the voice call normally, because even slightly degraded QoS may be insufficient for them, which is then mistakenly considered as a normal call release (not as a call drop).

As described above, once the UE detects the RLF, this either leads to a direct call drop or to the UE initiating the RRC re-establishment procedure (which, if not successful, causes the UE to go to the RRC idle state which, in turn, may be followed with a new RRC connection setup procedure into another cell). If such a RRC re-establishment procedure is successful and the T-RLF timer on the RAN node side is still on, the UE may recover the RLF. However, the RLF recovery takes, in this case, quite a long time period (it may be even 10 seconds or even more). Again, the end user perception on such a condition may be that one of the calling parties having a network connection may terminate the voice call normally, because interruption in the provided call voice service may be insufficient for him/her, which causes one to mistakenly consider this interruption as a normal call release (not as a call drop). Given this, a communications operator may, for example, mistakenly decide that network parameters (e.g., the radio link or the PRBs) should be not be adjusted anyhow.

The exemplary embodiments disclosed herein provide a technical solution that allows mitigating or even eliminating the above-sounded drawbacks peculiar to the prior art. In particular, the technical solution disclosed herein involves using, in a RAN node, two (at least partly) overlapping time periods to identify communication sessions (e.g., voice calls) which are mistakenly detected as normally terminated from the network perspective. More specifically, the first time period is used to monitor normal session releases initiated by a CN in respect of one or more communication sessions for one or more UEs. The second time period is used to check whether a RLF timer is already triggered at the time instant when the normal session release(s) is(are) detected by the RAN node within the first time period. If the RLF timer is already triggered, the number of the communication sessions to be normally released based on the normal session release(s) from the CN is counted and reported to a network management system. In response, the network management system may properly optimize RAN or other network parameters such that a call drop rate is improved in a wireless communication network.

FIG. 1 shows a block diagram of a RAN node 100 in accordance with one example embodiment. As shown in FIG. 1, the RAN node 100 comprises the following constructive elements: a processing unit 102, a storage unit 104, and a transceiving unit 106. The processing unit 102 is coupled to the storage unit 104 and the transceiving unit 106. The storage unit 104 stores processor-executable instructions 108 which, when executed by the processing unit 102, cause the processing unit 102 to perform the aspects of the present disclosure, as will be explained later. It should be noted that the number, arrangement and interconnection of the constructive elements constituting the RAN node 100, which are shown in FIG. 1, are not intended to be any limitation of the present disclosure, but merely used to provide a general idea of how the constructive elements may be implemented within the RAN node 100. In one other example embodiment, the transceiving unit 106 may be implemented as two individual devices, with one for receiving operations and another for transmitting operations. Irrespective of its implementation, the transceiving unit 106 is implied to be capable of performing different operations required to perform the reception and transmission of different signals, such, for example, as signal modulation/demodulation. For example, the transceiving unit 106 is configured to establish at least one communication session (e.g., a voice call) with a UE 110 (schematically shown as a smartphone) over a radio link 112, and to send a report 114 (which will be discussed layer in more detail) to a network management system.

The processing unit 102 may be implemented as a central processing unit (CPU), general-purpose processor, single-purpose processor, microcontroller, microprocessor, application specific integrated circuit (ASIC), field programmable gate array (FPGA), digital signal processor (DSP), complex programmable logic device, etc. It should be also noted that the processing unit 102 may be implemented as any combination of one or more of the aforesaid. As an example, the processing unit 102 may be a combination of two or more microprocessors.

The storage unit 104 may be implemented as a nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 108 stored in the storage unit 104 may be configured as a computer executable code which causes the processing unit 102 to perform the aspects of the present disclosure. The computer executable code for carrying out operations or steps for the aspects of the present disclosure may be written in any combination of one or more programming languages, such as Java, C++, or the like. In some examples, the computer executable code may be in the form of a high-level language or in a pre-compiled form, and be generated by an interpreter (also pre-stored in the storage unit 104) on the fly.

Figure 2:
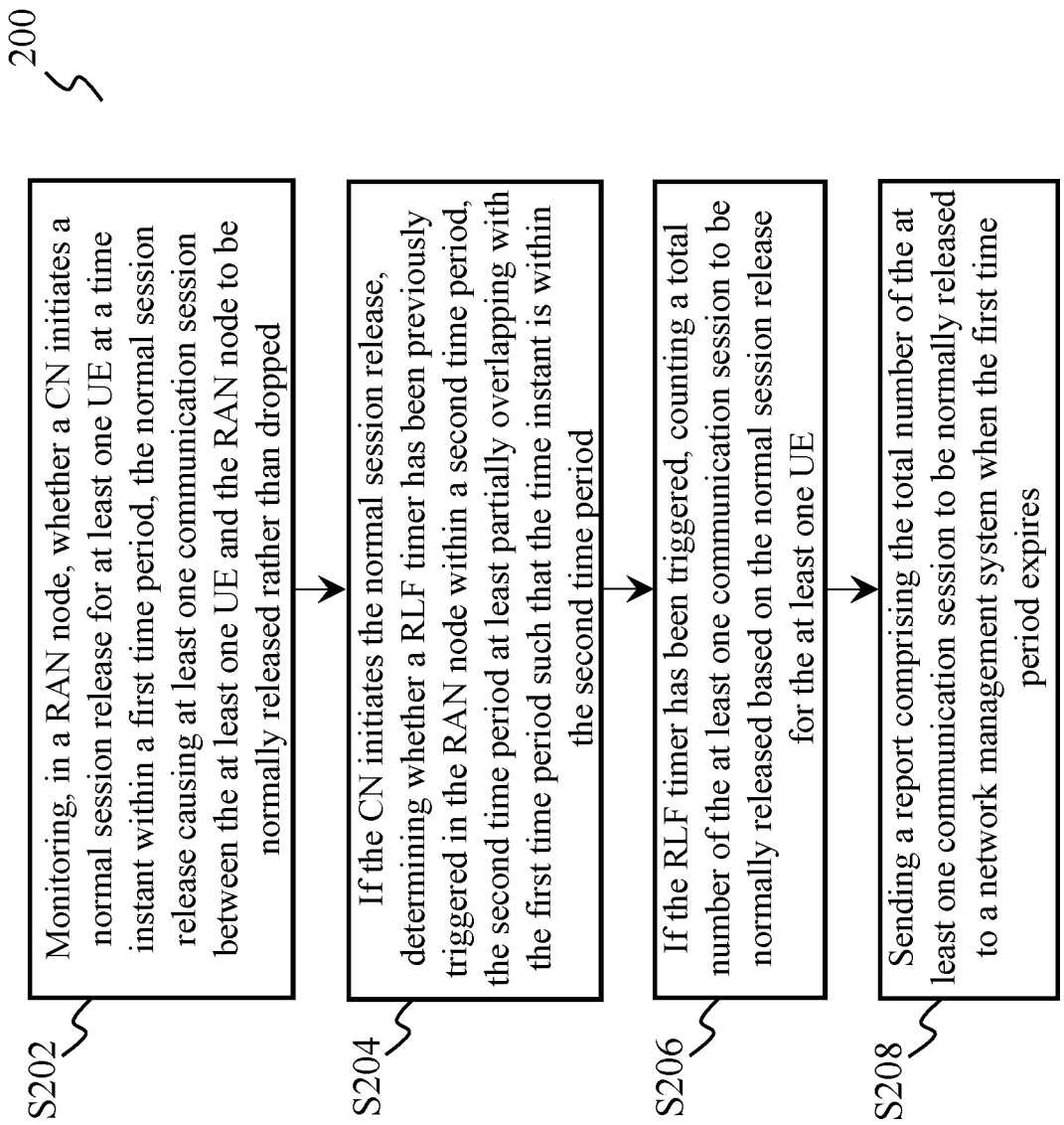
FIG. 2 shows a flowchart of a method for operating the RAN node shown in FIG. 1 in accordance with one example embodiment.

FIG. 2 shows a flowchart of a method 200 for operating the RAN node 100 in accordance with one example embodiment. Each of the steps of the method 200 is intended to be performed by corresponding one of the above-described constructive elements constituting the RAN node 100. The method 200 starts with a step S202, in which the processing unit 102 monitors whether a CN initiates a normal session release for at least one UE (like the UE 110) at a time instant within a first time period. In this case, the normal session release should be considered as an operation that causes at least one communication session between the UE(s) and the RAN node 100 to be normally released rather than dropped. The term "normally" means "under normal conditions", i.e. the communication session(s) should be released as it is usually done in the existing communication systems. Then, if the CN initiates the normal session release for the UE(s) at the time instant within the first time period, the method 200 proceeds to a step S204, in which the processing unit 102 determines whether a RLF timer has been previously triggered in the RAN node 100 within a second time period. The second time period at least partially overlaps with the first time period such that the time instant is within the second time period. The RLF timer indicates a potential loss of the communication session(s) by the UE(s). In other words, the RLF timer is triggered in case if there is a problem to communicate a communication service from or to the UE. At the same time, the term "previously" means that the RLF timer should be triggered within that part of the second time period which is provided before the time instant indicated in the step S202 (this nuance will be explained in more detail later with reference to FIG. 3). Next, if the RLF timer has been previously triggered in the RAN node 100 within the second time period, the method 200 goes on to a step S206, in which the processing unit 102 counts a total number of the communication session(s) to be normally released based on the normal session release for the UE(s). After that, the method 200 proceeds to a step S208, in which the processing unit 102 causes the transceiving unit 106 to send the report 114 comprising the total number of the at least one communication session to be normally released to a network management system when the first time period expires.

In one example embodiment, the step S202 of the method 200 is performed based on one or more RAB(s) in a 4G wireless communication system. If the communication session(s) to be normally released is(are) at least one voice call, the RAB(s) may comprise one or more E-UTRAN RABs with QCI1. Moreover, the method 200 may comprise an additional step, in which the processing unit 102 receives, in response to the normal session release, one or more E-RAB release commands from the CN.

In another example embodiment, the step S202 of the method 200 is performed based on one or more QoS flows in a 5G wireless communication system. If the communication session(s) to be normally released is at least one voice call, the QoS flow(s) may comprise one or more QoS with QFI1. Moreover, the method 200 may comprise an additional step, in which the processing unit 102 receives, in response to the normal session release, one or more PDU session release commands from the CN.

In one example embodiment, the method 200 may comprise additional steps, in which the processing unit 102 assigns an active status to the second time period if the RLF timer has been triggered in the RAN node 100 within the second time period and stores the active status of the second time period to the storage unit 104 of the RAN node 100. It should be noted that the active status is assigned irrespective of the result obtained in the step S202, i.e. whether the above-mentioned time instant or, in other words, the normal session release occurs. By using the stored active status, it is possible for the processing unit 102 to easily and quickly determine that the RLF timer has been triggered in the RAN node within the second time period before the time instant indicated in the step S202.

In one example embodiment, the first time period and the second time period are tunable depending on network conditions and user preferences. In this example embodiment, a communications operator may configure the first and second time periods depending, for example, on a type of the wireless communication network involved, and/or a type of the communication service(s) involved. For example, the first time period may be equal to 5, 10, 15 minutes, while the second time period may be a couple of seconds.

Figure 3:
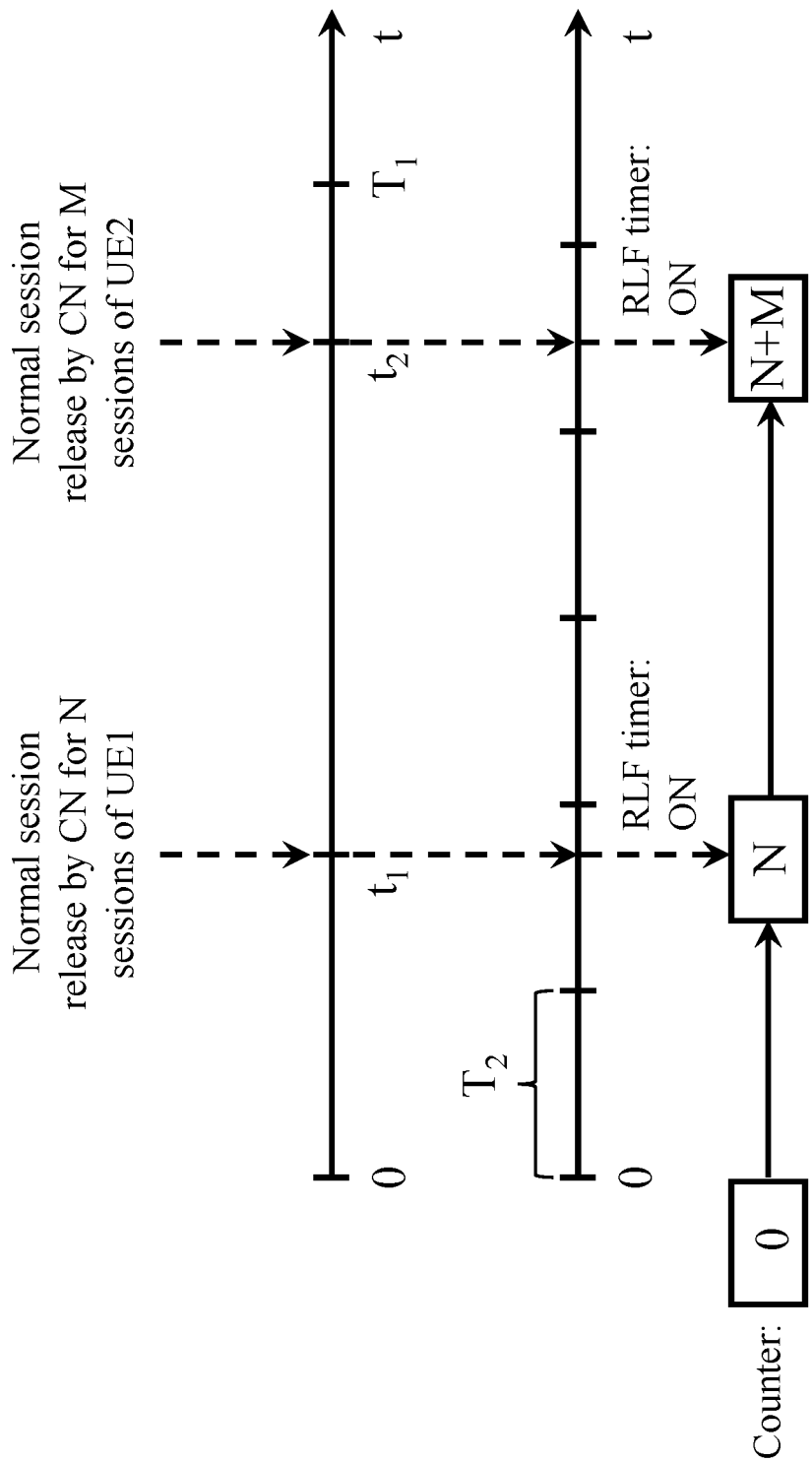
FIG. 3 schematically shows a timing diagram that explains how the method shown in FIG. 2 works in case of two UEs.

FIG. 3 schematically shows a timing diagram that explains how the method 200 works in case of two UEs, i.e. UE1 and UE2. More specifically, the timing diagram consists of two time axes, with the first (upper) time axis indicating the first time period having a length $T_1$ and the second (lower) time axis indicating the repeating second period having a length $T_2$. It should be noted that the first time period may be also a repeating time period, if required and depending on particular applications. The upper and lower time axes are aligned with each other for illustrative purposes only. In another embodiment, the second time axis or, in other words, the second time period may start earlier than the first time axis or, in other words, the first time period. In yet another embodiment, the second time period may have a length such that the second time period repeats at least several times before the first time period expires, and the last repetition of the second time period may end later or earlier than the first time period.

As follows from FIG. 3, the RAN node 100 detects the normal session release initiated by the CN for N sessions of the UE1 at a time instant $t_1$ and the normal session release initiated by the CN for M sessions of the UE2 at a time instant $t_2$, where N and M are natural numbers which may be equal to or different from each other. The time instants $t_1$ and $t_2$ are both within the first time period $T_1$. Moreover, it is implied that each of the time instants $t_1$ and $t_2$ is within a different repetition of the second time period $T_2$ (this arrangement of the time instants should be surely considered only as one example—in another embodiment, the time instants $t_1$ and $t_2$ may be both within the same repetition of the second time period $T_2$). From FIG. 3, it should be apparent to those skilled in the art that, irrespective of their starting and ending points and repetitions, the first and second time periods should overlap each other at least partially such that the corresponding time instants are within both of them. It is also assumed in FIG. 3 that the time instants $t_1$ and $t_2$ correspond to the situations when the RLF timer has been already triggered in the RAN node 100, i.e. the RLF timer has been triggered at any time between the starting point of the second timer period $T_2$ and the time instant $t_1$ or $t_2$. Given this, a counter which is used in the RAN node 100 will be set to a counter value equal to N at or after the time instant $t_1$, and then the counter value may be added with M at or after the time instant $t_2$. Since there is no other normal session release from the CN within the first time period $T_1$, this means that the processing unit 102 will cause the transceiving unit 106 to send the report 114 indicating the total number of N+M communication sessions to be normally released according to the normal session releases from the CN to the network management system when the first time period $T_1$ expires. These N+M communication sessions should be considered by the RAN node 100 and, subsequently, the network management system as the ones mistakenly detected as normally released, for which reason the network management system may take proper measures or actions to adjust network parameters. After the report 114 is sent to the network management system and if the first and second time periods are both repeating, the counter value may be reset to 0, and the above-described implementation of the method 200 may be similarly repeated again for the UE1 and the UE2, and/or any other UE(s).

Figure 4:
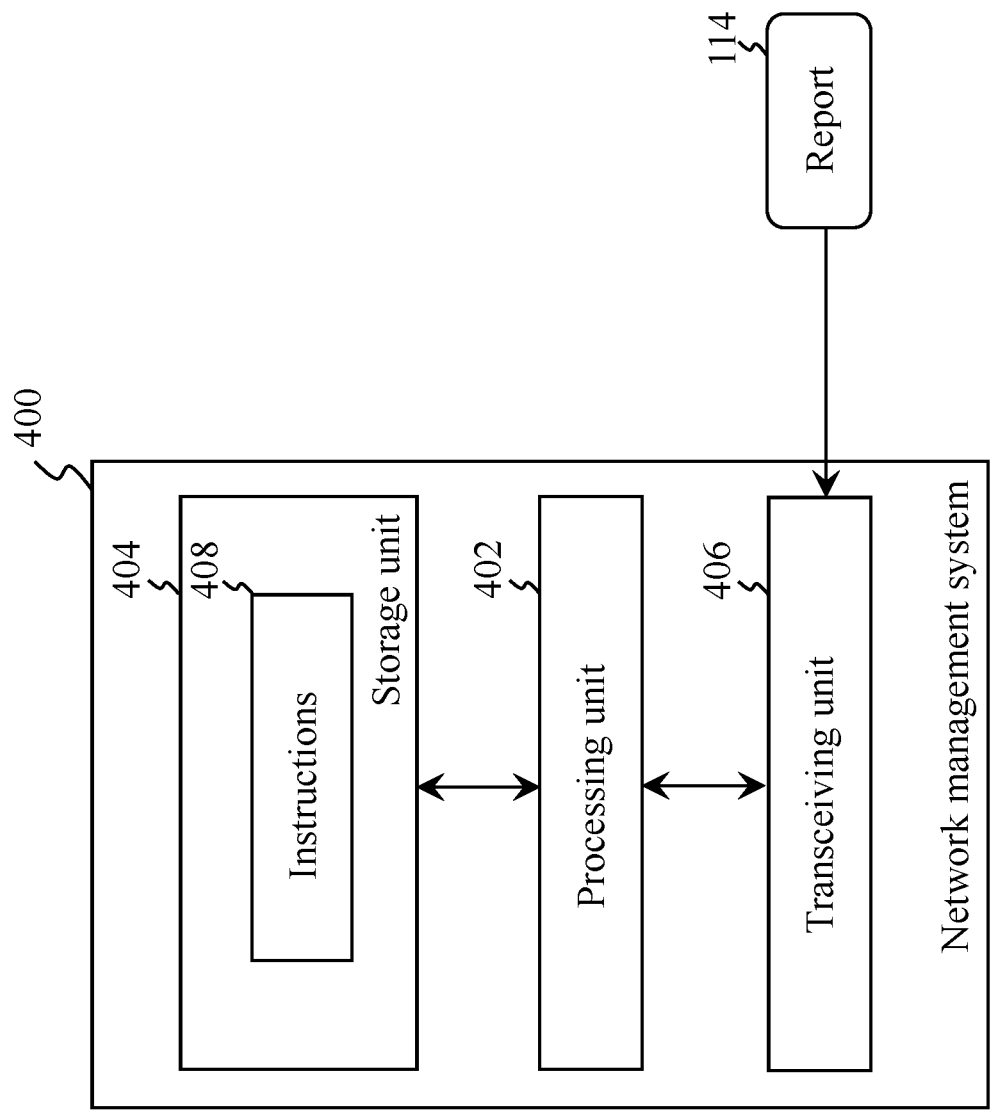
FIG. 4 shows a block diagram of a network management system in accordance with one example embodiment.

FIG. 4 shows a block diagram of a network management system 400 in accordance with one example embodiment. The network management system 400 is intended to communicate with the RAN node 100 to check whether it is required to adjust the network parameters or not. As shown in FIG. 4, the network management system 400 comprises a processing unit 402, a storage unit 404, and a transceiving unit 406. The processing unit 402 is coupled to the storage unit 404 and the transceiving unit 406. The storage unit 404 stores processor-executable instructions 408 which, when executed by the processing unit 402, cause the processing unit 402 to receive the report 114 from the RAN node 100 and use the total number of the communication session(s) to be normally released to decide whether to modify RAN or other network parameters. It should be noted that the number, arrangement and interconnection of the constructive elements constituting the network management system 400, which are shown in FIG. 4, are not intended to be any limitation of the present disclosure, but merely used to provide a general idea of how the constructive elements may be implemented within the network management system 400. Similar to the transceiving unit 106, the transceiving unit 406 may be implemented as two individual devices, with one for receiving operations and another for transmitting operation. Irrespective of its implementation, the transceiving unit 406 is implied to be capable of performing different operations required to perform the reception and transmission of different signals, such, for example, as signal modulation/demodulation.

Furthermore, the processing unit 402, the storage unit 404 and the processor-executable instructions 408 may be implemented in the same or similar manner as the processing unit 102, the storage unit 104 and the processor-executable instructions 108, respectively. In general, the network management system 400 may be implemented as external tool which allows network monitoring and optimization to be performed on a bigger level than one RAN node. For example, the network management system 400 may be implemented as the NetAct tool commercially available from Nokia.

It should be noted that each block or step of the method 200, or any combinations of the blocks or steps, can be implemented by various means, such as hardware, firmware, and/or software. As an example, one or more of the blocks or steps described above can be embodied by processor executable instructions, data structures, program modules, and other suitable data representations. Furthermore, the processor executable instructions which embody the blocks or steps described above can be stored on a corresponding data carrier and executed by at least one processor implementing functions of the RAN node 100. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the example embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A Radio Access Network (RAN) node comprising:
a transceiving unit;
a storage unit configured to store processor-executable instructions; and
a processing unit coupled to the storage unit and the transceiving unit, the processing unit is configured, when executing the processor-executable instructions, to:
monitor whether a Core Network (CN) initiates a normal session release for at least one user equipment (UE) at a time instant within a first time period, the normal session release causing at least one communication session between the at least one UE and the RAN node to be normally released rather than dropped;
if the CN initiates the normal session release for the at least one UE at the time instant within the first time period, determine whether a Radio Link Failure (RLF) timer has been previously triggered in the RAN node within a second time period, the RLF timer indicating a potential loss of the at least one communication session by the at least one UE, and the second time period at least partially overlapping with the first time period such that the time instant is within the second time period;
if the RLF timer has been previously triggered in the RAN node within the second time period, count a total number of the at least one communication session to be normally released based on the normal session release for the at least one UE; and
cause the transceiving unit to send a report comprising the total number of the at least one communication session to be normally released to a network management system when the first time period expires.

2. The RAN node of claim 1, wherein the processing unit is configured to perform said monitoring based on at least radio access bearer (RAB) in a 4G wireless communication system.

3. The RAN node of claim 2, wherein the at least one communication session to be normally released is at least one voice call, and wherein the at least one RAB comprises at least one Evolved Universal Terrestrial RAN (E-UTRAN) RAB with Quality of Service (QOS) Class Identifier 1 (QCI1).

4. The RAN node of claim 3, wherein the processing unit is further configured, in response to the normal session release, to cause the transceiving unit to receive at least one E-RAB release command from the CN.

5. The RAN node of claim 1, wherein the processing unit is configured to perform said monitoring based on at least one QoS flow in a 5G wireless communication system.

6. The RAN node of claim 5, wherein the at least one communication session to be normally released is at least one voice call, and wherein the at least one QoS flow comprises at least one QoS with QoS Flow Indicator 1 (QFI1).

7. The RAN node of claim 6, wherein the processing unit is further configured, in response to the normal session release, to cause the transceiving unit to receive at least one Protocol Data Unit (PDU) session release command from the CN.

8. The RAN node of claim 1, wherein the processing unit is further configured to:
assign an active status to the second time period if the RLF timer has been triggered in the RAN node within the second time period; and
store the active status of the second time period to the storage unit.

9. The RAN node of claim 1, wherein the first time period and the second time period are tunable depending on network conditions and user preferences.

10. A method for operating a Radio Access Network (RAN) node, comprising:
monitoring, in the RAN node, whether a Core Network (CN) initiates a normal session release for at least one user equipment (UE) at a time instant within a first time period, the normal session release causing at least one communication session between the at least one UE and the RAN node to be normally released rather than dropped;
if the CN initiates the normal session release for the at least one UE at the time instant within the first time period, determining whether a Radio Link Failure (RLF) timer has been previously triggered in the RAN node within a second time period, the RLF timer indicating a potential loss of the at least one communication session by the at least one UE, and the second time period at least partially overlapping with the first time period such that the time instant is within the second time period;
if the RLF timer has been triggered in the RAN node within the second time period, counting a total number of the at least one communication session to be normally released based on the normal session release for the at least one UE; and
sending a report comprising the total number of the at least one communication session to be normally released to a network management system when the first time period expires.

11. The method of claim 10, wherein said monitoring is performed based on at least radio access bearer (RAB) in a 4G wireless communication system or based on at least one Quality of Service (QOS) flow in a 5G wireless communication system.

12. The method of claim 10, further comprising:
assigning an active status to the second time period if the RLF timer has been triggered in the RAN node within the second time period; and
storing the active status of the second time period in the RAN node.

13. The method of claim 10, further comprising tuning the first time period and the second time period depending on network conditions and user preferences.

14. A computer program product comprising a non-transitory computer-readable medium that stores a computer code, wherein the computer code is configured, when executed by at least one processor, to cause the at least one processor to perform in the method of claim 10.

15. A network management system comprising:
a transceiving unit;
a storage unit configured to store processor-executable instructions; and
a processing unit coupled to the storage unit and the transceiving unit, the processing unit is configured, when executing the processor-executable instructions, to:
cause the transceiving unit to receive the report from the RAN node according to claim 1; and
based on the total number of the at least one communication session to be normally released, decide whether to modify RAN parameters.

* * * * *